United States Patent [19]

Beyer et al.

[11] 4,101,319

[45] Jul. 18, 1978

[54] PLASMA DEPOSITION WELDING POWDER FOR PRODUCING WEAR RESISTANT LAYERS

[75] Inventors: Horst Beyer; Ulrich Buran, both of Burscheid, Fed. Rep. of Germany

[73] Assignee: Goetzewerke Friedrich Goetze AG, Burscheid, Fed. Rep. of Germany

[21] Appl. No.: 687,661

[22] Filed: May 19, 1976

[30] Foreign Application Priority Data

May 22, 1975 [DE] Fed. Rep. of Germany ....... 2522690

[51] Int. Cl.² .......................... B32B 15/16; B22F 1/00
[52] U.S. Cl. ........................................ 75/252; 75/255; 428/553; 425/570
[58] Field of Search ............. 75/0.5 R, 0.5 B, 0.5 BA, 75/0.5 BB, 0.5 BC, 252, 254, 255; 428/553, 570

[56] References Cited

U.S. PATENT DOCUMENTS

| 3,690,686 | 9/1972 | Prasse et al. ........................ 75/0.5 R |
| 3,890,137 | 6/1975 | Beyer et al. ........................ 75/0.5 R |
| 3,936,295 | 2/1976 | Cromwell et al. ................. 75/0.5 R |
| 3,991,240 | 11/1976 | Harrington ....................... 75/0.5 BA |

FOREIGN PATENT DOCUMENTS

| 1,042,708 | 9/1966 | United Kingdom. |
| 1,102,845 | 2/1968 | United Kingdom. |
| 1,389,726 | 4/1975 | United Kingdom. |
| 1,263,859 | 2/1972 | United Kingdom. |

*Primary Examiner*—W. Stallard
*Attorney, Agent, or Firm*—Spencer & Kaye

[57] ABSTRACT

Plasma deposition welding powder for the production of a wear-resistant coating on machine parts subject to friction consists essentially of a mixture of two components A and B, of which component A is present at 70 to 99.5 weight percent of the total of A and B. Component A comprises at least one metal selected from the group consisting of molybdenum and tungsten. Component B is present at 0.5 to 30 weight percent of the total of A and B and consists essentially of at least one alloy or compound of at least one of the metals selected from the group consisting of cobalt, chromium, iron, nickel, copper and manganese, with at least one of the elements selected from the group consisting of phosphorus, boron and silicon.

16 Claims, No Drawings

PLASMA DEPOSITION WELDING POWDER FOR PRODUCING WEAR RESISTANT LAYERS

BACKGROUND OF THE INVENTION

The present invention relates to a plasma deposition welding powder for the production of wear-resistant layers on machine parts which are subject to friction, and more particularly, to a plasma deposition welding powder for producing wear-resistant layers on sealing strips in rotary engines and piston rings of piston engines, particularly those made preferably of cast iron which is rich in carbon and silicon.

The friction partners which seal the combustion chamber of a rotary engine are the chamber walls of the rotary engine which have a trochoidal shape and the sealing strips which are disposed at the corners of the rotary engine rotor. Sealing strips in rotary engines are subject to high operation pressures and temperatures during running of the engine as well as to high friction stresses with possibly insufficient lubrication and high corrosion stresses. It is therefore necessary to provide the sealing strips with wear-resistant surfaces in their area of greatest stress, i.e., in the area where they contact the trochoidal chamber wall. Care must be taken, however, that low-wear movement is assured for both of the friction partners which seal the combustion chambers, i.e., the sealing strip and the trochoidal chamber walls, so that mutual compatibility of the sealing strips and trochoidal chamber walls is necessary.

Protective layers or coatings have been used for the contact surfaces of the trochoidal chamber walls and such layers which have been found satisfactory in practice are, particular, electrolytically-deposited hard chromium layers, electrolytically-deposited nickel layers with embedded silicon carbides, and thermal spray layers. All of these layers, however, are inherently very wear-resistant and thus heavily attack their friction partners (the sealing strips) due to their high hardness. Thus, the sealing strip material which contacts the trochoidal chamber wall must be a material which is compatible with the trochoidal chamber wall coating and which has a wear-resistance that assures perfect operation. In one prior art technique, sealing strips which are made entirely of a material which can withstand such stresses without wear are known and can be produced, but either their breaking and bending strength is too low or they are too expensive so that economical use of such materials is not worthwhile.

In another prior art technique, the contact surfaces of the sealing strip have been provided with protective coatings according to known coating methods. For example, thermal spray layers have been applied to the contact surfaces of sealing strips, but were found to be ineffective due to the layer stability being too low. In addition, chemical reaction layers, chemical vapor-deposited (CVD) layers and vapor-deposited layers have been tried as protective layers for the contact surfaces of sealing strips, but were found unsatisfactory due to poor adhesion and layer thickness. Moreover, electrodeposited layers have been tried as protective coatings for the contact surfaces of sealing strips, but have been found to be unsatisfactory because of their poor wear-resistance.

Wear-resistant layers applied by plasma deposition welding have been used as protective coatings for the contact surfaces of sealing strips and overcome the above-mentioned drawbacks, but the deposition welding powder of molybdenum and/or tungsten, possibly with the addition of metallic alloys previously used for such purposes, forms coating layers on the contact surfaces of sealing strips which have poor compatibility with the contact surface coatings of the trochoidal chamber walls, particularly if these are made of electrodeposited nickel layers with silicon carbides embedded therein. Grooves are formed on the friction surfaces and, after longer periods of use, the engine malfunctions.

SUMMARY OF THE INVENTION

It is therefore an object of the present invention to provide an improved powder mixture with which coatings which have good adhesion and wear-resistance can be produced by plasma deposition welding.

It is a further object of the present invention to provide a plasma deposition welding powder mixture for producing a coating on a sealing strip with the coating being compatible with the coating on the trochoidal chamber wall of a rotary engine.

Another object of the present invention is to provide a plasma deposition welding powder mixture for producing such a coating on a sealing strip made from cast iron rich in carbon and silicon.

Additional objects and advantages of the present invention will be set forth in part in the description which follows and in part will be obvious from the description or can be learned by practice of the invention. The objects and advantages are achieved by means of the compositions, instrumentalities and combinations particularly pointed out in the appended claims.

To achieve the foregoing objects, and in accordance with its purpose, the present invention, as embodied and broadly described, provides a plasma deposition welding powder consisting essentially of a mixture of two powder components A and B. Component A is present in the deposition welding powder at from about 70 to about 99.5% weight percent, based on the total weight of A and B. Component A comprises at least one metal selected from the group consisting of molybdenum and tungsten. Component B is present at between about 0.5 and 30 weight percent of the total of A and B and consists essentially of at least one alloy or compound of at least one of the metals selected from the group consisting of cobalt, chromium, iron, nickel, copper and manganese, with at least one of the elements selected from the group consisting of phosphorus, boron and silicon.

Sealing strips provided with coatings of the powder of the present invention by means of plasma deposition welding on their contact surfaces were tested in a running engine against a trochoidal chamber wall provided with an electrodeposited nickel layer containing embedded silicon carbides. After the test runs, neither the trochoidal chamber wall nor the sealing strip exhibited grooves and breaks, and the rate of wear on both partners was low.

It is to be understood that both the foregoing general description and the following detailed description are exemplary, but are not restrictive of the invention.

DETAILED DESCRIPTION OF THE INVENTION

The plasma deposition welding powder of the present invention contains a component A as a first component, present in an amount of from about 70 to about 99.5 weight percent of the total weight of A and B. Component A comprises at least one metal selected from the group consisting of molybdenum and tungsten. The tungsten or molybdenum of component A of the plasma deposition welding powder of the present invention can be present in the plasma deposition welding powder in the form of tungsten powder, molybdenum powder, a mixture of tungsten powder and molybdenum powder, or an alloy of tungsten and molybdenum in powder form. When a mixture or alloy of tungsten with molybdenum is used, the weight percent of each metal in the mixture or alloy may vary from 0 to 100, but it is preferred to use mixtures containing 50 to 100 percent molybdenum with the remainder tungsten.

The molybdenum and/or tungsten can be the sole materials in component A, or component A can contain at least one further metal selected from the group consisting of tantalum, niobium, zirconium, chromium, vanadium and titanium. This further metal can be added to component A as individual metallic elements or can be added in the form of alloys, such as alloys with each other, or with the molybdenum or tungsten in component A. The total amount of this further metal, either singly or in combination, which may be contained in component A can be up to about 35 percent by weight of component A, preferably 5 to 20 percent by weight. In the practice of the present invention, molybdenum powder alloys containing titanium in an amount of from 5 to 35 percent, and preferably 5 to 20 percent, have been found to be particularly satisfactory as powder component A.

The further metals of tantalum, niobium, zirconium, chromium, vanadium and titanium that can be present in component A are carbide-forming materials and can form mixed carbides with the molybdenum and/or tungsten present in the powder to significantly increase the wear-resistance of the layer or deposit formed by the plasma deposition welding powder.

The plasma deposition welding powder of the present invention contains a component B as a second component, present in an amount of from about 0.5 to 30 weight percent of the total weight of A and B. Component B consists essentially of at least one of the commercially available alloys or compounds of at least one of the metals selected from the group consisting of the metals cobalt, chromium iron, nickel, copper and manganese, with at least one of the elements selected from the group consisting of phosphorus, boron and silicon, as well as impurities normally associated with these products as a result of their manufacturing process. Oxygen, sulfur, nitrogen, carbon, calcium and aluminum can be present in component B.

For component B, good results have been obtained with a powder component B of commercially available, technical grade, alloy powders, such as ferrophosphorus, ferroboron and ferrosilicon. These powders additionally contain impurity elements which are inherent in their manufacturing process. A preferred ferrophosphorus powder for use as component B contains 55 to 70% iron, 18 to 24% phosphorus, 9 to 12% calcium, 2 to 6% silicon and 1 to 3% manganese. A preferred ferroboron for use as component B contains 23 to 26% boron, 1 to 2% silicon, 1 to 3% aluminum 1 to 2% copper, 0.5 to 1.5% manganese and the remainder iron. A preferred ferrosilicon for use as component B contains 72 to 76% silicon, 0.5 to 1.5% aluminum, 0.1 to 1.0% calcium and the remainder iron. Likewise good results are obtained with the use of, for example, copper phosphide and chromium boride as component B. A preferred chromium boride for use as component B contains 75 to 95% chromium and the remainder boron.

The average particle size of the two powder components A and B that are used in the plasma deposition welding powder of the present invention can be between 40 to 150 μm, preferably between 60 to 75 μm, and the thicknesses of the coatings lie between 0,1 to 3,0 mm depending on their particular application.

In the practice of the present invention, it is possible for the plasma deposition welding powder of the present invention to contain up to a maximum of 10 weight percent graphite, based on the total of A and B, mixed-in as a dry lubricant.

Generally, the wear-resistant coatings of the present invention are formed on a cast iron base material which contains iron, carbon and silicon. The plasma deposition welding powder of the present invention, however, can be used to form welded wear-resistant layers on other substrates. In cases where the wear-resistant layers of the present invention are welded onto nonferrous metals, quantities of iron, carbon and silicon are added to the powder. The quantity of these components in the powder then corresponds to the proportion of these elements which would participate during welding on a cast iron base material by mixing of the base material and coating material.

In the case of a steel or aluminium base material the additional elements to the plasma deposition welding powders are 1,1 – 2,2% silicon powder and 1,5 – 5,5% graphite powder or 1,5 – 5,5% graphite powder and 15 – 20% iron powder respectively. The resulting coatings have a high wear resistance.

When the plasma deposition welding powder contains carbide-forming metals in component A, the carbide-forming metals are converted during the plasma deposition welding process to carbides which contribute to the wear-resistance of the weld deposit. The carbon required for this carbide formation may be obtained from materials providing carbon. Thus, the base material on which the plasma deposition welding powder is deposited, that is, the material which is protected by the weld deposit, can provide the necessary carbon for the carbide formation. For example, when cast iron is the base or parent material on which the weld deposit is formed, this base material can provide the necessary carbon for the carbide formation. In the case of depositing such a layer onto a base material containing no carbon, then carbon must initially be added to the powder mixture either in the form of fine graphite or carbon-containing compounds. The content of carbon for this purpose is preferably between 5 to 15 percent by weight. For example, iron carbide can be added to the plasma deposition welding powder to provide the necessary carbon for the carbide formation. Similarly, carbon can be added to the plasma deposition welding powder to provide the necessary carbon for carbide formation.

When the plasma deposition welding powder contains these carbide-forming materials, they replace part of the molybdenum and tungsten in the plasma deposition welding powder so that the total molybdenum and tungsten content of such a plasma deposition welding powder generally ranges from about 45.5 to about 94.5 weight percent.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

A sealing strip of normally alloyed cast iron and having the dimensions 6.5 mm width, 12 mm height and 70 mm length is coated by plasma deposition welding with a wear-resistant layer of a mixture of 85% of component A and 15% of component B. Component A consists of an alloy powder containing 85% molybdenum and 15% titanium. Component B consists of ferrophosphorus with 60% iron, 22% phosphorus, 11% calcium, 5% silicon and 2% manganese. The powder mixture of components A and B is applied to the contact surface of a sealing strip to a thickness of about 3 mm. In the following step, the sliding surface is machined by grinding. The sealing strips are tested for ten hours in a running rotary engine having a coating on the contact surfaces of its trochoidal chamber wall of electroplated nickel containing embedded silicon carbide. Both contact surfaces, that is, the contact surface of the sealing strip and that of the trochoidal chamber wall, exhibit only slight wear and no grooves or breaks.

EXAMPLE 2

A plasma deposition welded layer of 90% of component A and 10% of component B is produced on a sealing strip under the same conditions as in Example 1. Component A consists of an alloy powder with 70% molybdenum and 30% titanium. Component B consists of ferrosilicon with 74% silicon, 1% aluminum, 0.5% calcium and 24.5% iron. The powder mixture of components A and B is applied to the contact surface of the sealing strip to a thickness of about 3 mm. In the following step, the sliding surface is machined by grinding. After test runs in a rotary engine under the conditions of Example 1, both contact surfaces, that is, the contact surface of the sealing strip and that of the trochoidal chamber wall, exhibit only slight wear and no grooves or breaks.

EXAMPLE 3

A plasma deposition welded layer is applied to a cast-iron sealing strip. The plasma deposition welded layer contained 90% of component A consisting of an alloy powder with 70% molybdenum and 30% titanium and 10% of component B of chromium boride with 85% chromium and 15% boron. The powder mixture of components A and B is applied to the contact surface of the sealing strip to a thickness of about 3 mm. In the following step, the sliding surface is machined by grinding. After a test run in a rotary engine under the conditions of Example 1, both contact surfaces, that is, the contact surface of the sealing strip and that of the trochoidal chamber wall, exhibit little wear and no grooves and no breaks.

It will be understood that the above description of the present invention is susceptible to various modifications, changes and adaptations, and the same are intended to be comprehended within the meaning and range of equivalents of the appended claims.

What is claimed is:

1. Plasma deposition welding powder for the production of wear-resistant layers or machine parts subject to friction, consists essentially of a powder mixture of two components A and B, of which component A is present at about 70 to 99.5 weight percent of the total of A and B, component A comprising at least one metal selected from the group consisting of molybdenum and tungsten, component B being present at about 0.5 to 30 weight percent of the total of A and B, and consisting essentially of at least one alloy or compound of at least one of the metals selected from the group consisting of cobalt, chromium, iron, nickel, copper and manganese, with at least phosphorus.

2. The plasma deposition welding powder as defined in claim 1 wherein component A consists of an alloy powder containing 65 to 95 weight percent molybdenum and 5 to 35 weight percent titanium.

3. The plasma deposition welding powder as defined in claim 1 wherein component B consists essentially of a technical ferrophosphorus powder which contains, based on the weight of component B, 55 to 70 weight percent iron, 18 to 24 weight percent phosphorus, and 9 to 12 weight percent calcium, 2 to 6 weight percent silicon and 1 to 3 weight percent manganese as impurities.

4. The plasma deposition welding powder as defined in claim 1 wherein up to 10 weight percent graphite are additionally mixed into the powder mixture, based on the total weight of components A and B.

5. The plasma deposition welding powder as defined in claim 1 wherein component A contains at least one further metal selected from the group consisting of tantalum, niobium, zirconium, chromium, vanadium and titanium.

6. The plasma deposition welding powder as defined in claim 5 wherein the further metal in component A is present at an amount of up to 35 weight percent, based on the weight of component A.

7. The plasma deposition welding powder as defined in claim 5 wherein the further metal in component A is present at an amount of from 5 to 35 weight percent, based on the weight of component A.

8. A machine part which is subject to friction and which contains a wear-resistant layer formed by plasma deposition welding of a plasma deposition welding powder which consists essentially of a powder mixture of two components A and B, of which component A is present at about 70 to 99.5 weight percent of the total of A and B, component A comprising at least one metal selected from the group consisting of molybdenum and tungsten, component B being present at about 0.5 to 30 weight percent of the total of A and B, and consisting essentially of at least one alloy or compound of at least one of the metals selected from the group consisting of cobalt, chromium, iron, nickel, copper and manganese, with at least phosphorus.

9. The machine part as defined in claim 8 wherein component A consists of an alloy powder containing 65 to 95 weight percent molybdenum and 5 to 35 weight percent titanium.

10. The machine part as defined in claim 8 wherein component B consists of a technical ferrophosphorus powder which contains, based on the weight of component B, 55 to 70 weight percent iron, 18 to 24 weight percent phosphorus, and 9 to 12 weight percent calcium, 2 to 6 weight percent silicon and 1 to 3 weight percent manganese as impurities.

11. The machine part as defined in claim 8 wherein up to 10 weight percent graphite are additionally mixed into the powder mixture, based on the total weight of components A and B.

12. The machine part as defined in claim 8 wherein component A contains at least one further metal selected from the group consisting of tantalum, niobium, zirconium, chromium, vanadium and titanium.

13. The machine part as defined in claim 12 wherein the further metal in component A is present at an amount of up to 35 weight percent, based on the weight of component A.

14. The machine part as defined in claim 12 wherein the further metal in component A is present at an amount of from 5 to 35 weight percent, based on the weight of component A.

15. The machine part as defined in claim 8 which is in the form of a sealing strip.

16. The machine part as defined in claim 8 which is in the form of a piston ring for a piston engine.

* * * * *